(12) United States Patent
Wiggins

(10) Patent No.: US 8,429,253 B1
(45) Date of Patent: Apr. 23, 2013

(54) METHOD AND SYSTEM FOR DETECTING CHANGES IN COMPUTER FILES AND SETTINGS AND AUTOMATING THE MIGRATION OF SETTINGS AND FILES TO COMPUTERS

(75) Inventor: Greg Wiggins, Pleasant Grove, UT (US)

(73) Assignee: Symantec Corporation, Mountain View, CA (US)

( * ) Notice: Subject to any disclaimer, the term of this patent is extended or adjusted under 35 U.S.C. 154(b) by 2400 days.

(21) Appl. No.: 10/765,770

(22) Filed: Jan. 27, 2004

(51) Int. Cl.
*G06F 15/177* (2006.01)
*G06F 11/00* (2006.01)

(52) U.S. Cl.
USPC .................................. 709/221; 714/37; 713/1

(58) Field of Classification Search .................... 709/221
See application file for complete search history.

(56) References Cited

U.S. PATENT DOCUMENTS

| | | | |
|---|---|---|---|
| 6,199,204 B1 | 3/2001 | Donohue | 717/11 |
| 6,269,382 B1 | 7/2001 | Cabrera et al. | 707/204 |
| RE37,418 E | 10/2001 | Tindell et al. | 345/302 |
| 6,304,895 B1 | 10/2001 | Schneider et al. | 709/203 |
| 6,324,543 B1 | 11/2001 | Cohen et al. | 707/200 |
| 6,345,311 B1 | 2/2002 | Breslau et al. | 709/310 |
| 6,347,398 B1 | 2/2002 | Parthasarathy et al. | 717/11 |
| 6,367,077 B1 | 4/2002 | Brodersen et al. | 717/170 |
| 6,370,646 B1 | 4/2002 | Goodman et al. | 713/100 |
| 6,370,682 B1 | 4/2002 | Eckardt et al. | 717/1 |
| 6,377,962 B1 | 4/2002 | Tindell et al. | 707/515 |
| 6,377,991 B1 | 4/2002 | Smith et al. | 709/226 |
| 6,389,451 B1 | 5/2002 | Hart | 709/201 |
| 6,389,538 B1 | 5/2002 | Gruse et al. | 713/194 |
| 6,389,592 B1 | 5/2002 | Ayres et al. | 717/172 |
| 6,393,459 B1 | 5/2002 | Lurndal | 709/203 |
| 6,393,516 B2 | 5/2002 | Johnson | 711/111 |
| 6,393,537 B1 | 5/2002 | Kern et al. | 711/162 |
| 6,826,715 B1 * | 11/2004 | Meyer et al. | 714/37 |
| 2002/0174329 A1 * | 11/2002 | Bowler et al. | 713/1 |
| 2004/0083355 A1 * | 4/2004 | Smith et al. | 713/1 |
| 2004/0128203 A1 * | 7/2004 | Pierre et al. | 705/26 |
| 2005/0010918 A1 * | 1/2005 | Childs et al. | 717/174 |
| 2006/0031407 A1 * | 2/2006 | Dispensa et al. | 709/219 |

FOREIGN PATENT DOCUMENTS

WO    WO 01/61470    *   8/2001

* cited by examiner

*Primary Examiner* — Phuoc Nguyen
*Assistant Examiner* — Kishin G Belani
(74) *Attorney, Agent, or Firm* — ALG Intellectual Property, LLC

(57) ABSTRACT

A system and method for managing and performing migration of individual settings and files from a user's computer to a second computer which provides complete migration by establishing a base set and at the appropriate times stores a scan of the current status of the settings and files. In one embodiment the current status is determined upon demand of the user, while in another embodiment the current status is performed automatically as any changes in settings or files are detected.

19 Claims, 6 Drawing Sheets

METHOD AND SYSTEM FOR DETECTING CHANGES IN COMPUTER FILES AND SETTINGS AND AUTOMATING THE MIGRATION OF SETTINGS AND FILES TO COMPUTERS

BACKGROUND OF INVENTION

1. Field of the Invention

This invention relates to computer software utilities for managing settings and files. More specifically, this invention relates to methods and systems for managing the migration of a user's settings and files from one computer system to another.

2. Description of Related Art

A variety of computer migration tools have been described and may be in use. However, these tools generally do not have any effective way of insuring a full migration of a user's specific settings and files. Rather the user must have a substantial knowledge of the files and settings in order to guarantee a complete migration. Since few users have such knowledge, the migration of settings and files from one computer to another is at best problematic and at worst doomed to create errors and possibly failure.

The reader is referred to the following U.S. Patent documents for general background material. Each of these patents is hereby incorporated by reference in its entirety for the material contained therein.

U.S. Pat. No. 6,199,204 describes a method and mechanism for automating updating of computer programs.

U.S. Pat. No. 6,269,382 describes a system and method for hierarchical storage management.

U.S. Pat. No. 6,304,895 describes a method and system for remotely accessing and controlling at least one of a target switch and a target computer using a target controller.

U.S. Pat. No. RE 37,418 describes a method and system for providing synchronizing of the timing of various multimedia events, including a visual event.

U.S. Pat. No. 6,324,543 describes a method and system which allows programs to become dynamically reconfigurable without programmer intervention.

U.S. Pat. No. 6,345,311 describes a method and system which in an object-oriented computer system, objects that execute in different, heterogeneous execution environments.

U.S. Pat. No. 6,347,398 describes a method and system to automatically locate, download, verify, install, register and display computer software components from a computer network like the Internet or an intranet.

U.S. Pat. No. 6,367,077 describes a method for upgrading a software application from a prior version to a subsequent version while preserving user modifications to the prior application.

U.S. Pat. No. 6,370,646 describes a method and system for migrating a computing environment from a source computing platform to a destination computing platform.

U.S. Pat. No. 6,370,682 describes a system and method for the re-use and platform independence of application software that is achieved by using component types comprising an interface and a body.

U.S. Pat. No. 6,377,962 describes a system for connecting a video object to various multimedia objects to enable an object-oriented simulation of a multimedia presentation using a computer with a storage and a display.

U.S. Pat. No. 6,377,991 describes a method, computer program product, and system for migrating URL data objects in a proxy server array when an array member is removed, added, or temporarily unavailable.

U.S. Pat. No. 6,389,451 describes a distributed digital rule processor used to create a single system image (SSI) on a cluster of von Neumann processors.

U.S. Pat. No. 6,389,538 describes a system for tracking usage of digital content on user devices.

U.S. Pat. No. 6,389,592 describes a method for updating a first version of installed application files to a second version.

U.S. Pat. No. 6,393,459 describes a method for creating a process in a multicomputer system that includes interconnected multiple sites.

U.S. Pat. No. 6,393,516 describes a system and method for storage medium group parity protection that stores data files and related parity information asynchronously on an array of storage media.

U.S. Pat. No. 6,393,537 describes a storage and host controller managed outboard data management tool, wherein the host controller defines logical paths between various storage controllers and data storage devices, and the storage controller manages the movement of data to and from the various data storage devices while only sending data to the host processing if necessary.

SUMMARY OF INVENTION

It is desirable to provide a system and method for detecting changes in computer files and registry values of a first computer and then to automate the migration of settings and files to a second computer. It is particularly desirable to provide such a system and method that provides snap shot and/or real time monitoring of the changes.

Accordingly, it is an object of an embodiment of this invention to provide a method and system for detecting changes in computer files.

It is another object of an embodiment of this invention to provide a method and system for detecting changes in computer registry values.

It is a further object of one embodiment of this invention to provide a method and system for detecting changes in computer files using a snap shot of the files approach.

Another object of one embodiment of this invention is to provide a method and system for detecting changes in registry values using a snap shot of the registry approach.

A further object of a second embodiment of this invention is to provide a method and system for detecting changes in computer files using a real-time approach.

A still further object of a second embodiment of this invention is to provide a method and system for detecting changes in registry values using a real-time approach.

It is another object of this invention to provide a method and system for migrating files and registry values from a first computer to a second computer.

It is a further object of an embodiment of this invention to provide a method and system for migrating files and registry values from the first computer to the second computer using logged changes in files and registry values.

It is a still further object of an embodiment of this invention to provide a method and system for migrating files and registry values from the first computer to the second computer that in some embodiments provides a logical user view for control of the migration of files and values.

A further object of this invention is to provide, in some embodiments, a method and system for detecting changes in computer files and registry values by periodic collecting file and value information.

A still further object of this invention is to provide, in some embodiments, a method and system for detecting changes in computer files and registry values where collected data is compressed for storage.

It is another object of an embodiment of this invention to provide a method and system for detecting changes in files and values in a computer that is compatible with operation on personal computers.

It is a further object of an embodiment of this invention to provide a method and system for detecting changes and migrating computer information from one computer to another computer that performs the detection automatically and facilitates the efficient migration of files.

It is another object of an embodiment of this invention to provide a method and system for detecting changes and migrating computer information from one computer to another computer where the computer information can be shared locally or over a network.

In various embodiments of this invention some, all or additional objects may be incorporated in the invention. Additional objects, advantages and other novel features of this invention will be set forth in part in the description that follows and in part will become apparent to those skilled in the art upon examination of the following or may be learned with the practice of the invention. Still other objects of the present invention will become readily apparent to those skilled in the art from the following description wherein there is shown and described the present preferred embodiments of the invention, simply by way of illustration of several modes best suited to carry out this invention. The objects and advantages of this invention may be realized and attained by means of the instrumentalities and combinations particularly pointed out in the appended claims. As it will be realized, this invention is capable of other different embodiments, and its several details, and specific components and steps, are capable of modification in various aspects without departing from the concept of this invention. Accordingly, these objects and the following drawings and descriptions should be regarded as illustrative in nature and not as restrictive.

BRIEF DESCRIPTION OF DRAWINGS

The accompanying drawings incorporated in and forming a part of the specification, illustrate a preferred embodiment of the present invention. Some, although not all, alternative embodiments are described in the following description. In the drawings.

Reference will now be made in detail to the present preferred embodiment of the invention, an example of which is illustration in the accompanying drawings.

DETAILED DESCRIPTION

This invention is a system and method for managing the migration of files, application settings and system settings from a first computer system to a second computer system. In order to guarantee a full and complete migration of such information from one computer to another a knowledge base of the files and settings (or personality) created or modified by a user is required. In an organization environment the need to complete migrations of this information between computers is complicated by the likelihood that individual users will have customized the settings and files on their individual computers, and determining what files and settings have changed is exacerbated with an increase of time and usage.

In one present embodiment, referred to herein as the "snap-shot embodiment", this invention is accomplished by specific computer code (or software) operating on an individual personal computer (PC) as well as on a networked computer. Initially, the process is executed to record the current state (or relevant data) of the PC's files and settings. This recorded information is placed in a data collection. When the user desires to migrate his "personality" (files, system and application settings) to another computer the process is executed again. The then current state of the PC is collected and compared against the first recorded data. This comparison provides a list or table of resulting changes, which is analyzed and used to create a migration plan.

In another present embodiment of this invention, referred to herein as the "real-time monitor embodiment", the process provides monitoring to track and record changes made to files and settings, rather than recording the current state of the PC. When a user desires to migrate the "personality" the data is analyzed and a migration plan is created.

The migration plan can be analyzed and the "personality" migrated, using this invention, without asking the user for any feedback or information regarding the PC "personality". This invention also provides the capability of presenting the analyzed data to the advanced user in an understandable form and permits this advanced user to make customized changes to the plan prior to performing the migration.

Figure 1:
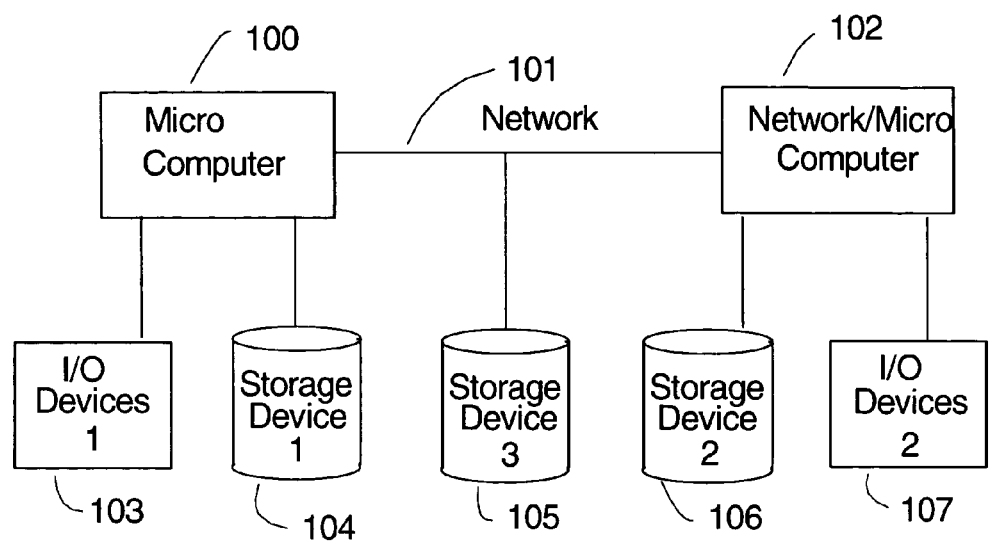
FIG. 1 is a top level system block diagram showing the major components of this invention.

FIG. 1 shows a top-level system block diagram showing the major components of this invention. In a typical configuration this invention operates on a microcomputer system 100 that is networked 101 to a network or other microcomputer 102. In alternative embodiments, the method of this invention can be performed on a stand-alone computer without a connection to another computer device. The micro computer 100 is provided with one or more input/output devices 103, such as displays, keyboards, mouse or other pointing devices, printers and the like. One or more storage devices 104 are also provided in electronic communication with the microcomputer 100. The typical storage devices 104 include dynamic memory, removable disks, fixed disks, magnetic tape, writeable compact disks or DVDs and the like. These storage devices 104 are used to store the PC operating system along with its system settings, application programs and application settings, and other files, including data files, utility files, system files, application files, temporary files and computer hardware driver files. Since, in order to perform a complete migration of settings and files from one computer to another it is necessary to maintain a knowledge base of the status of the various settings and files typically resident on the storage device 104 of the PC. In a typical use this invention operates with the microcomputer 100 networked (connected for communication) with one or more other computer devices. Generally, these other computer devices include a network storage device 105, which typically is used to store the backups of data used on the network and to store network common programs and files. A network/micro computer 102 is generally provided in network communication with the microcomputer 100. The network/micro computer 102 may be the computer, which is the recipient of the migration of the microcomputer 100 files, and settings or it may be only the controller for the process of this invention and may itself be in communication with another computer that is intended to be the recipient of the migration of settings and files. The typical network/micro computer 102 is provided with one or more input/output devices 107, as defined above, as well as one or more storage devices 106, also as defined above. The network itself is a communication channel whereby one computer device may communicate with another. The network may be wired or wireless, may be a large network such as the World Wide Web, or may be as small as a connection between two computation devices. The computer devices, including the microcomputer 100 and the network/micro computer 102, may be personal computers, microcomputers, mini computers, mainframe computers, networks of computers, personal data assistants (pda), and/or any other microprocessor controlled computational devices. In the present preferred embodiment of the invention the process of migration management is embodied in a computer software program resident on the user's PC, microcomputer 100, although in alternative embodiments the program performing the process of this invention can be operated from an alternative networked computer 102.

Figure 2:
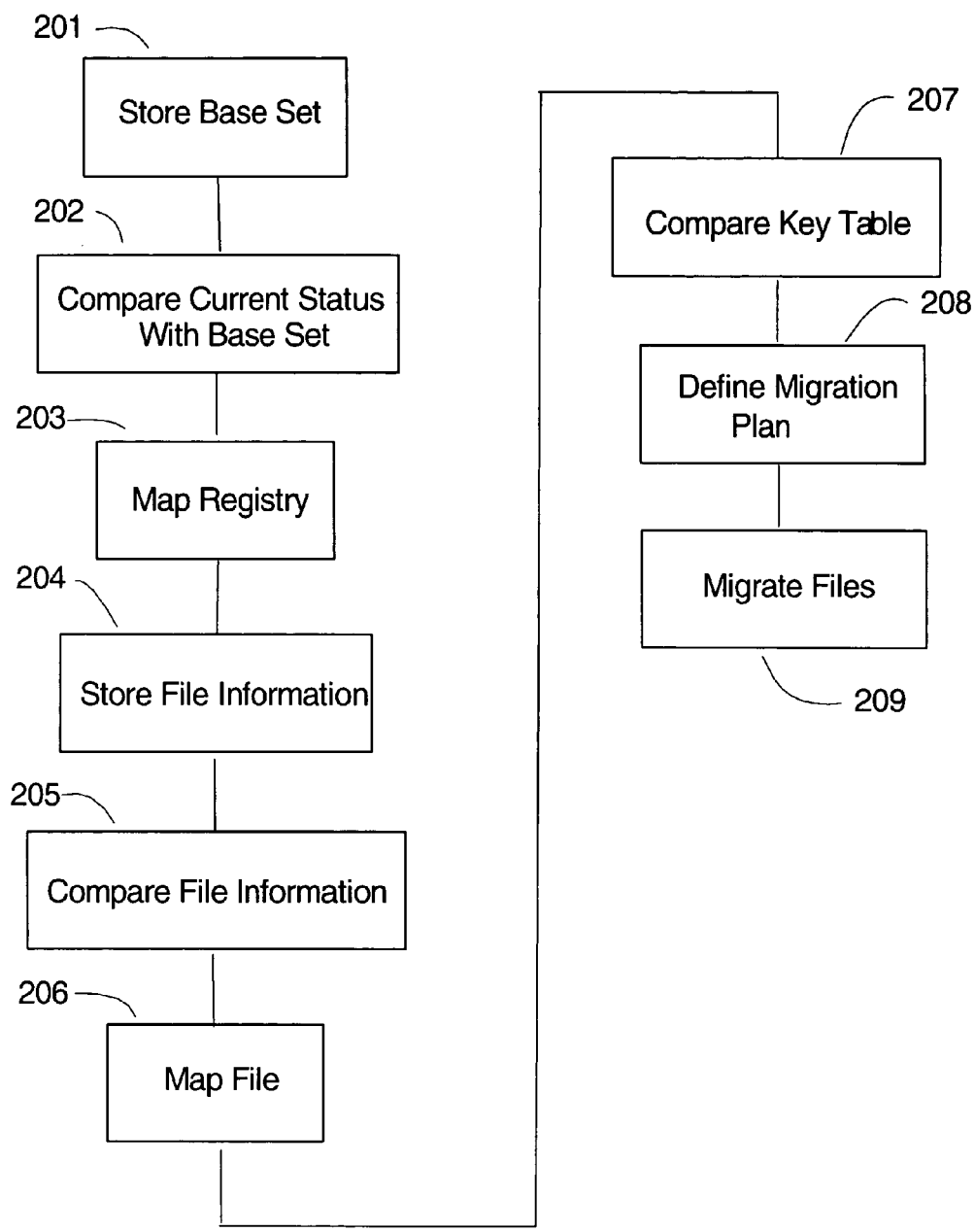
FIG. 2 is a top-level flow chart of the present embodiment of this invention.

FIG. 2 shows a top-level flow chart of the present embodiment of this invention. The base set, consisting of the current state of the PC's, microcomputer 100, files and settings are stored 201 in a data collection or database. When the user is ready to migrate his "personality" or computer settings and files, the then current state of the microcomputer 100 files and settings is retrieved and compared 202 with the base set. The registry information is mapped 203 to a key/value table. The key/value table of the present embodiment is a table of registry/applications/files and values applicable for the transfer or configuration of the system, applications and/or files. The file information is stored 204. File information is compared 205 with the file information in the base set. File information is mapped 206 to a key/value table. A comparison 207 with the base set key/value table is made to define 208 the registry and files for migration that is built during the above scan process. The registry and file information is then migrated 209 from the microcomputer 100 to a second computer system.

Figure 3:
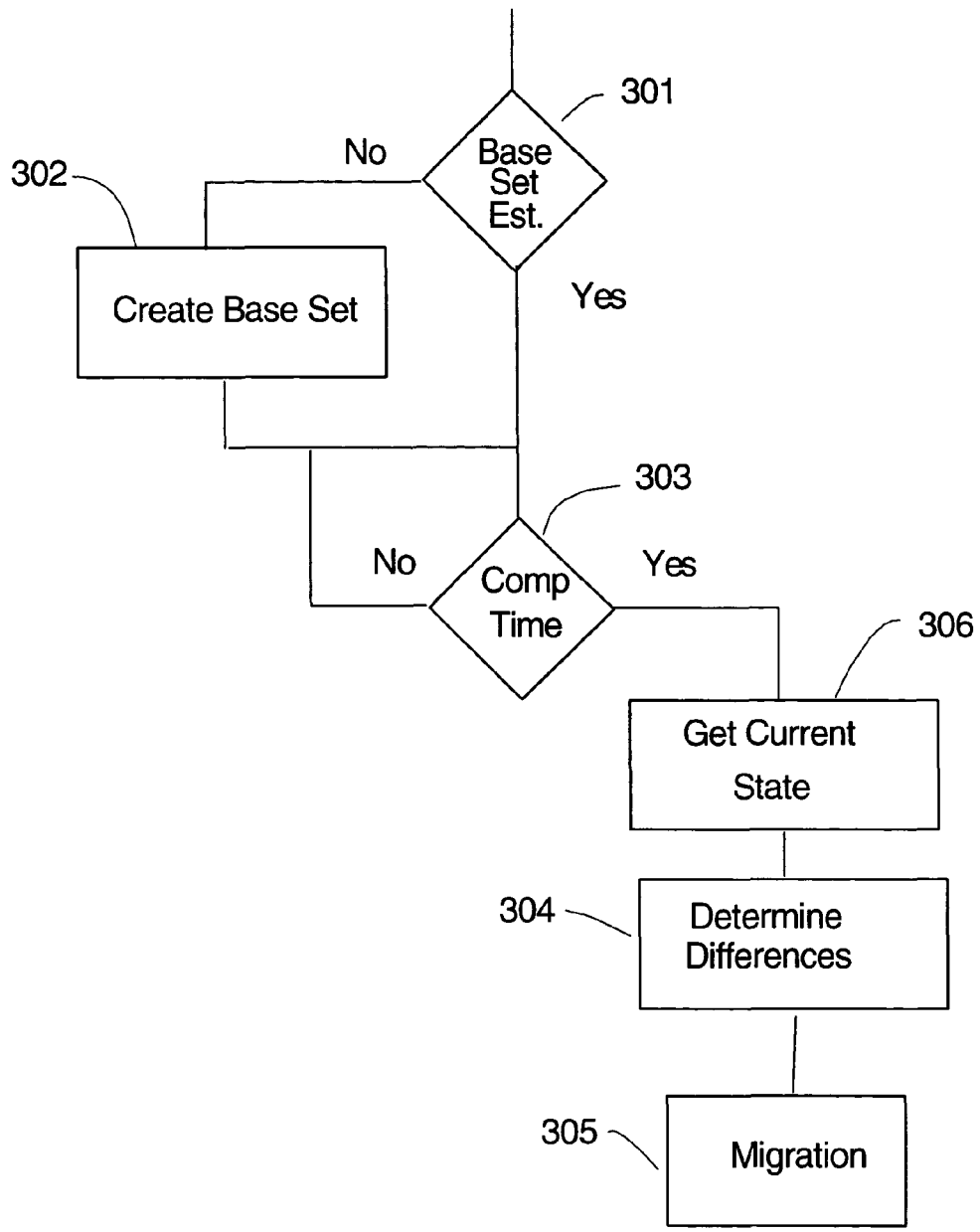
FIG. 3 is a detailed flow chart of the first embodiment of the snap-shot type detection process of this invention.

FIG. 3 shows a detailed flow chart of the first embodiment of the snapshot type detection process of this invention. In this snapshot process the registry and file information is scanned and stored initially to produce the base set and later compared when the user wishes to initiate migration. Additional scans, storage and comparisons of the required migration information may be accomplished, but need not necessarily be accomplished, in this embodiment of the invention. A test 301 is made to determine if a base set has been established. If no base set has been established, this is the initial scan and therefore a base set of required registry and file information is created 302. Once the base set has been created 302 or if the base set has been established 301 at test 303 is made to determine if the time for comparison or whether the user is ready to migrate his/her personality. If not, the process continues to wait. If it is time to ready for migration, then the computer is scanned for determination of the current state 306 and the differences between the present settings and files are determined 304 as shown in further detail in FIG. 5. The process is completed with the migration 305 of the settings and files from the user's computer 100 to a second computer system.

Figure 4:
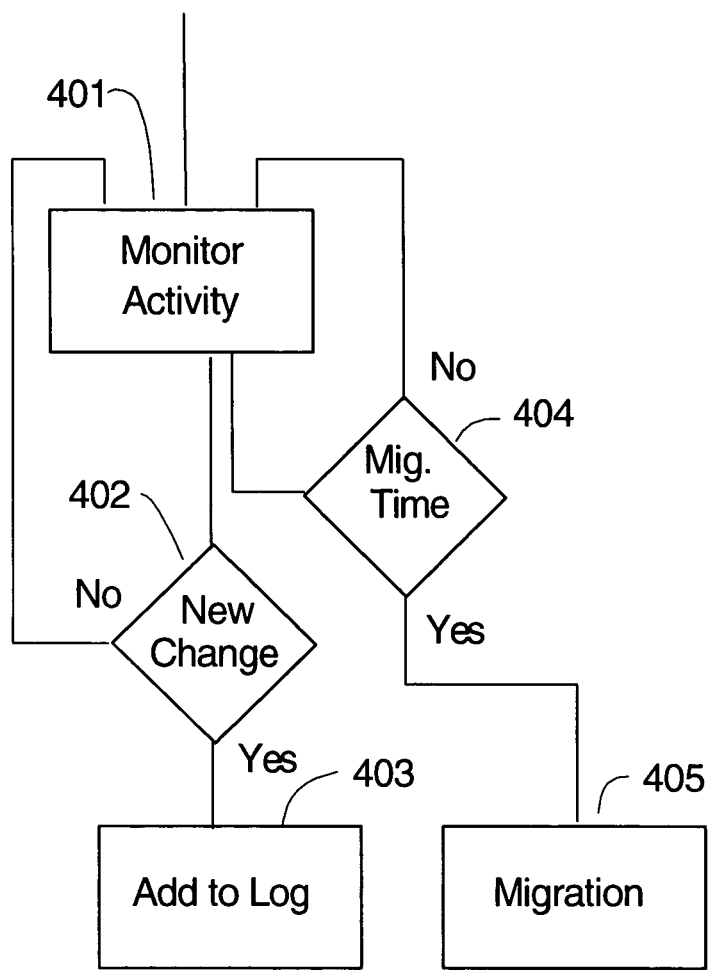
FIG. 4 is a detailed flow chart of the second embodiment of the real-time type detection process of this invention.

FIG. 4 shows a detailed flow chart of the second embodiment of the real-time type detection process of this invention. In this real-time detection embodiment of the invention the registry and file information is monitored and a running log is stored each time a change is made to the registry and file information on the computer system 100. The process waits monitoring 401 until a change in the settings and/or file information is made. At which time, a test 402 is made to determine if such a change has already been recorded. Any new changes will be recorded for future reference 403. When requested 404, changes are analyzed, and migration 405 of the settings and files from computer 100 to a second computer is completed.

Figure 5:
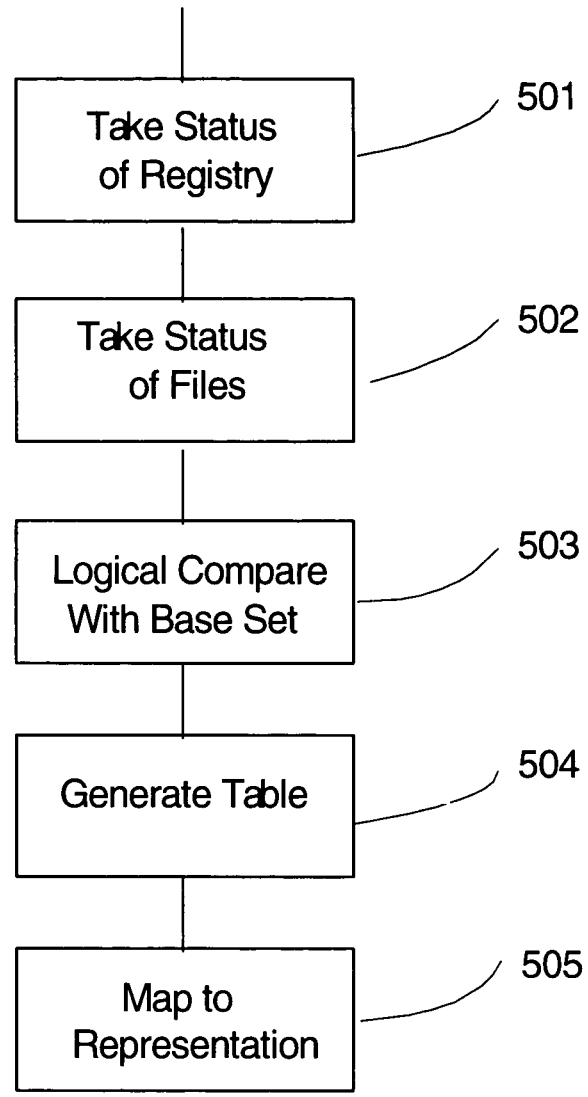
FIG. 5 is a detailed flow chart of the determine differences step of the snap-shot and real-time process embodiments of this invention.

FIG. 5 shows a detailed flow chart of the determine differences step of the snapshot and process embodiment of this invention depicted in FIG. 3 above. The present status of the registry is taken 501 or scanned and stored. The status of files is taken 502 or scanned and stored. A logical comparison is performed 503 between the taken status of the registry and the files and the base set. A table of key registry, functions, applications and file information and values associated with each for migration is generated 504. The table of key information is mapped 505 to a representation for application, operating system and file use.

Figure 6:
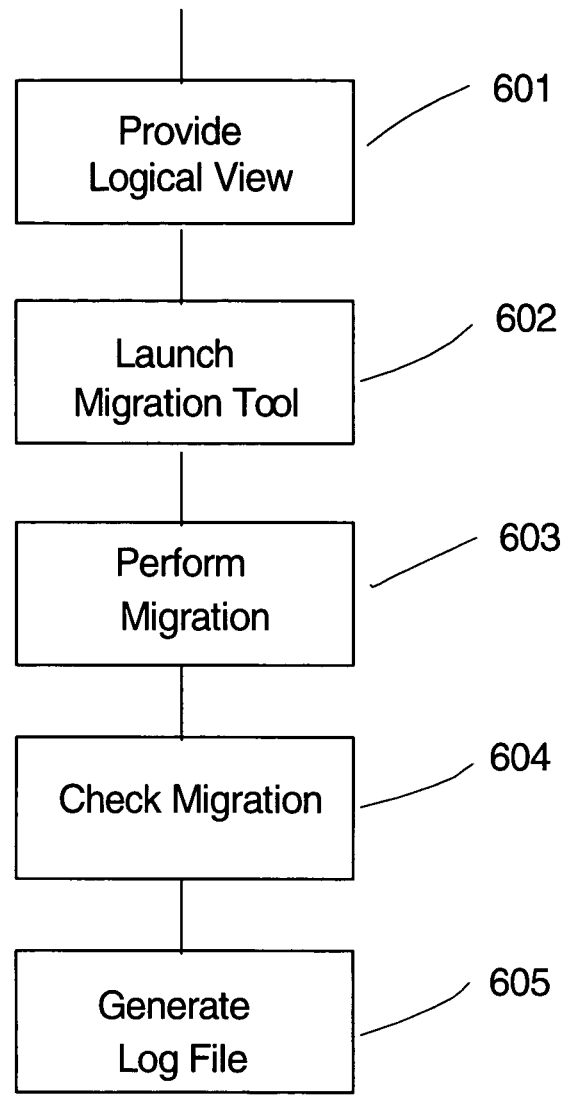
FIG. 6 is a detailed flow chart of the migration step of the present embodiment of this invention.

FIG. 6 shows a detailed flow chart of the migration step of the present embodiment of this invention. Once the migration itself is initiated a logical view of the settings and files for migration is provided 601. In some embodiments of the invention the user is provided the capability of customizing the migration by editing, adding and/or subtracting information from the logical view of settings and files for migration. The migration tool is launched 602. The migration tool implements migration of the settings and files by transferring the settings and files to the recipient computer memory by writing the settings and files to the appropriate location in memory using standard network interface communication routines and utilities or local storage medium. The migration is performed 603 moving the settings and files to the recipient computer. Migration may be, but need not necessarily be, checked 604 by confirming that the settings and files received are the same as those intended to be sent. Checking can be performed in several manners, including, but not limited to, use of an embedded checksum, resend and logical compare and/or user visual confirmation. A log file is generated 605 to document the migration. The log file in some embodiments may also be used to provide the base set for the settings and files on the new computer.

It is to be understood that the above described and referenced embodiments and examples are merely illustrative of numerous and varied other embodiments and applications which may constitute applications of the principles of the invention. These example embodiments are not intended to be exhaustive or to limit the invention to the precise form, connection, steps, choice of components or modules disclosed herein as present preferred embodiments of the invention. Obvious modifications or variations are possible and foreseeable in light of the above teachings. These embodiments of the invention were chosen and described to provide the best illustration of the principles of the invention and its practical applications to thereby enable one of ordinary skill in the art to make and use the invention, without undue experimentation. Other embodiments may be readily devised by those skilled in the art without departing from the spirit or scope of this invention and it is our intent that they be deemed to be within the scope of this invention, as determined by the appended claims when they are interpreted in accordance with the breadth to which they are fairly, legally and equitably entitled.

The invention claimed is:

1. A system for migration of files and settings between computers comprising:
   (A) a first computer system having a processor, a storage device in communication with said processor, an input device in communication with said processor and an output device in communication with said processor;
   (B) one or more settings resident on said storage device;
   (C) one or more files resident on said storage device;
   (D) a second computer system in communication with said first computer system; and
   (E) a program for managing a migration of said one or more settings and said one or more files, said program resident on said storage device; said program comprising the steps of:
      (1) storing a base set comprising said one or more settings and file information corresponding to said one or more files for said first computer system at a first time;
      (2) determining a current state of said first computer system, said current state comprising at least a portion of said one or more settings and said file information at a second time;
      (3) comparing said current state of said first computer system with said base set of said first computer system to provide a table of changes;
      (4) analyzing said table of changes to create a migration plan;
      (5) migrating said one or more files and said one or more settings from said first computer system to said second computer system based on said migration plan.

2. A system for migration of files and settings between computers, as recited in claim 1, wherein said program further comprises the steps of:
   (i) determining if said base set has been established;
   (ii) creating said base set if said base set has not been established;
   (iii) determining if it is time to perform said comparison of said current state with said base set; and
   (iv) determining the differences between the said current state and said base set.

3. A system for migration of files and settings between computers, as recited in claim 2 wherein said one or more settings comprise registry settings, and wherein said determining the differences further comprises the steps of:
   (a) taking a state of registry of said first computer system;
   (b) taking a state of said one or more files of said first computer system;
   (c) comparing said state of said registry and said state of said one or more files with said base set; and
   (d) generating said migration plan.

4. A system for migration of files and settings between computers, as recited in claim 1, wherein said migrating further comprises the steps of:
   (a) providing a logical view of said one or more files and said one or more settings;
   (b) launching a migration tool;
   (c) performing said migration of said one or more files and said one or more settings from said first computer system to said second computer system;
   (d) checking said migration to confirm that said one or more files and said one or more settings are received by said second computer; and
   (e) generating a log file.

5. A system for migration of files and settings between computers, as recited in claim 1 wherein said program further comprises the steps of:
   (1) determining if a change to said one or more settings has been made between said first time and said second time;
   (2) determining if a change to said one or more settings has been made between said first time and said second time; and
   (3) recording said changes to said one or more settings and said one or more files.

6. A system for migration of files and settings between computers, as recited in claim 5 wherein said one or more settings comprise registry settings, and wherein said determining the differences further comprises the steps of:
   (a) taking a state of registry of said first computer system;
   (b) taking a state of said one or more files of said first computer system; and
   (c) generating said migration plan.

7. A system for migration of files and settings between computers, as recited in claim 5, wherein said migrating further comprises the steps of:
   (a) providing a logical view of said one or more files and said one or more settings;
   (b) launching a migration tool;
   (c) performing said migration of said one or more files and said one or more settings from said first computer system to said second computer system;
   (d) checking said migration to confirm that said one or more files and said one or more settings are received by said second computer system; and
   (e) generating a log file.

8. A method for managing the migration of settings and files between computers, comprising:
   (A) storing a base set comprising settings and file information for a source computer at a first time;
   (B) determining a current state of said source computer, said current state comprising at least a portion of said settings and said file information for said source computer at a second time; comparing current state with said base set
   (C) comparing said current state of said source computer with said base set of said source computer to map differences in said settings and said file information between said first time and said second time
   (D) comparing a key table to said differences to define a migration plan; and
   (E) migrating said settings and one or more files corresponding to said file information from said source computer to a destination computer based on an automatic analysis of said migration plan, said automatic analysis being performed without receiving input from a user.

9. A method for managing the migration of settings and files between computers, as recited in claim 8, wherein said storing a base set further comprises:
   (1) identifying if a base set has been created; and
   (2) if no base set has been created, scanning a present state of said one or more files and said settings of said source computer at said first time and storing said present state of said one or more files and said settings as said base set.

10. A method for managing the migration of settings and files between computers, as recited in claim 8, wherein said comparing said current state of said source computer with said base set further comprises:
   (1) scanning a current state of said settings and said one or more files of said source computer at said second time;
   (2) storing said current state of said settings and said one or more files;
   (3) comparing said current state of said settings with said base set;

(4) comparing said current state of said one or more files with said base set; and (5) storing the results of said comparison.

11. A method for managing the migration of settings and files between computers, as recited in claim 10, wherein said comparing said key table further comprises: logically comparing keys and associated values of said current state of said settings and said one or more files with keys and associated values of said base set.

12. A method for managing the migration of settings and files between computers, as recited in claim 11, wherein said migrating further comprises:

(1) reading said results of said comparison; and (2) writing said results to a storage device.

13. A method for managing the migration of settings and files between computers, comprising:

(A) determining if a base set has been established said base set comprising settings and file information for a first computer system;

(B) creating said base set if no base set has been established;

(C) determining if it is time for comparison of said base set and a current state of said first computer system;

(D) if it is time for a comparison determining differences between the current state of the settings and files and the settings and files in said base set;

(E) analyzing said differences to create a migration plan; and (F) migrating said differences to a second computer system based on said migration plan.

14. A method for managing the migration of settings and files between computers, as recited in claim 13, wherein said settings comprise registry settings and wherein said determining differences further comprises:

(1) Taking the current state of the registry settings of the first computer system;

(2) taking the current state of the files of the first computer system;

(3) comparing said current state of said registry settings with the settings in said base set;

(4) comparing said current state of said files with the files in said base set; and (5) generating a table of keys and values.

15. A method for managing the migration of settings and files between computers as recited in claim 13, wherein said migrating further comprises;

(1) providing a logical view of said differences in files and settings;

(2) launching a migration tool;

(3) performing said migrations;

(4) checking said migration to confirm that said differences are received by said second computer system; and (5) generating a log file.

16. A method for managing the migration of settings and files between computers, comprising:

(A) monitoring a first computer for changes to settings and files on said first computer;

(B) determining that a change has been made to at least one of:

a setting on said first computer;

a file on said first computer;

(C) recording said change;

(D) determining a state of said first computer based on said change;

(E) analyzing said state of said first computer to create a migration plan; and (F) migrating said state to a second computer based on said migration plan.

17. A method for managing the migration of settings and files between computers, as recited in claim 16, wherein said determining said change comprises:

(1) taking a current state of registry settings of said first computer;

(2) taking a current state of the files of said first computer;

(3) generating a table of keys and values.

18. A method for managing the migration of settings and files between computers, as recited in claim 16, wherein said migrating further comprises:

(1) providing a logical view of said state of said first computer;

(2) launching a migration tool;

(3) performing said migration of said state to said second computer;

(4) checking said migration to confirm that said state is received by said second computer; and (5) generating a log file.

19. The system of claim 1, wherein said migration plan is created without receiving input from a user.

* * * * *